United States Patent

[11] 3,568,161

| [72] | Inventor | Elwyn Raymond Knickel<br>2560 36th St. NW, Washington, D.C. 20007 |
|---|---|---|
| [21] | Appl. No. | 757,410 |
| [22] | Filed | Sept. 4, 1968 |
| [45] | Patented | Mar. 2, 1971 |

[54] VEHICLE LOCATOR SYSTEM
35 Claims, 5 Drawing Figs.

| [52] | U.S. Cl. | 340/172.5, 340/24 |
|---|---|---|
| [51] | Int. Cl. | G06f 15/20 |
| [50] | Field of Search | 340/172.5, 24, 26; 325/53, 3 |

[56] References Cited
UNITED STATES PATENTS

| 2,844,711 | 7/1958 | Byrne et al. | 325/3X |
| 2,877,343 | 3/1959 | Mitchell | 325/53X |
| 3,310,741 | 3/1967 | Uitermark et al. | 325/53X |
| 3,376,509 | 4/1968 | Wilcox et al. | 325/53X |
| 3,419,865 | 12/1968 | Chisholm | 340/24X |

*Primary Examiner*—Paul J. Henon
*Assistant Examiner*—R. F. Chapuran
*Attorney*—Hurvitz, Rose and Greene ABSTRACT: A system for automatically locating vehicles within a prescribed area utilizes an emitter comprising a coded transmitter device carried by each vehicle, a plurality of sensor stations disposed at preselected locations within the prescribed area for receiving vehicle identification-coded signals from nearby vehicles, a vehicle identification decoder for processing of coded signals received by the sensor stations, and a digital computer for processing decoded information to locate each vehicle on the basis of which sensor station most recently received that vehicle's coded signal. The system may be utilized for police car location, whereby existing police call boxes may be utilized as sensor stations, and wherein a display map is provided on which lamps are lighted to indicate the presence of a police car sufficiently close to a call box to have its signal received thereby. Apart from the identification code, additional coded information may be emitted indicating vehicle status (i.e., fully loaded bus, for example, in a bus locator system) or emergency situations.

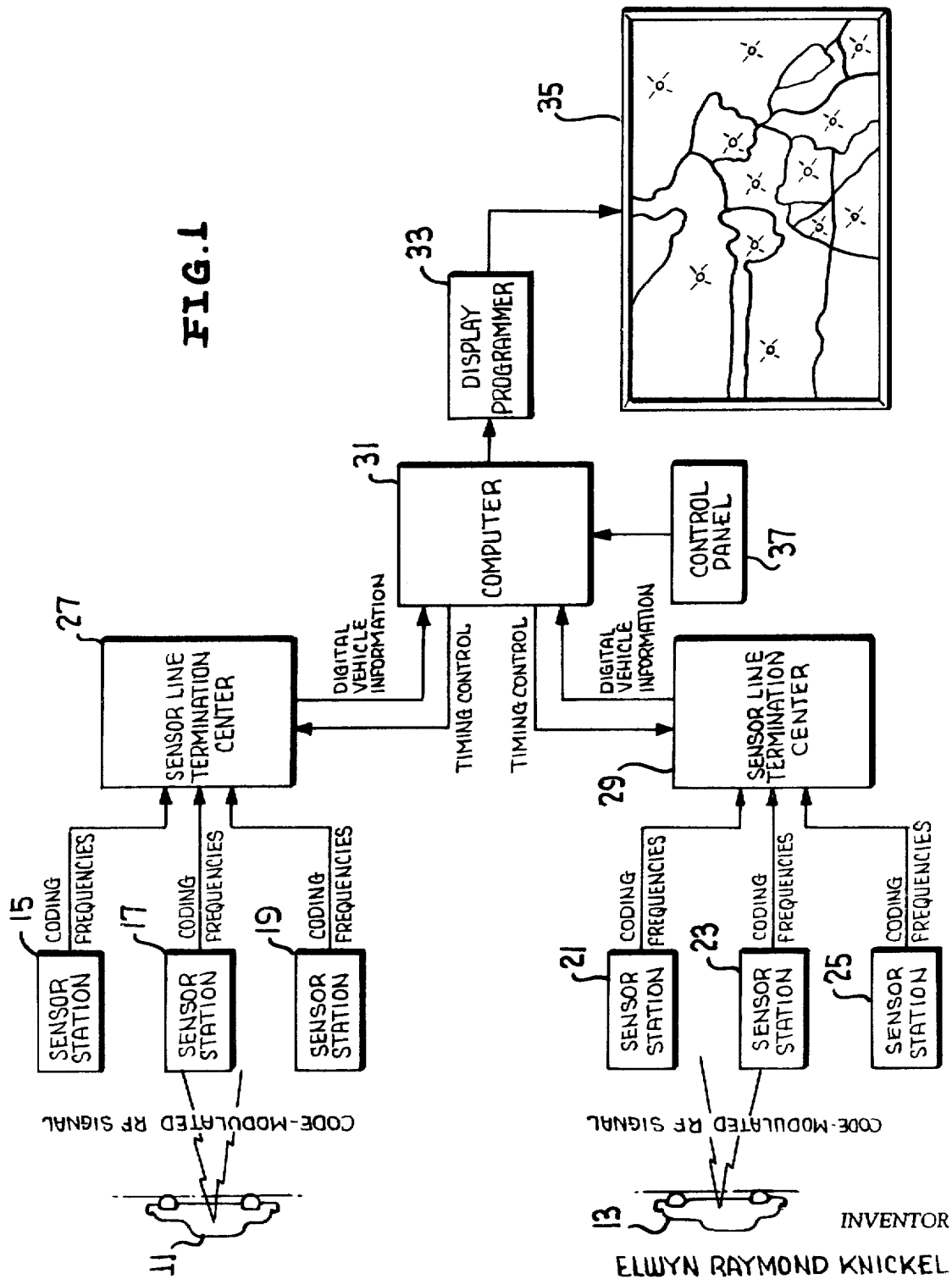

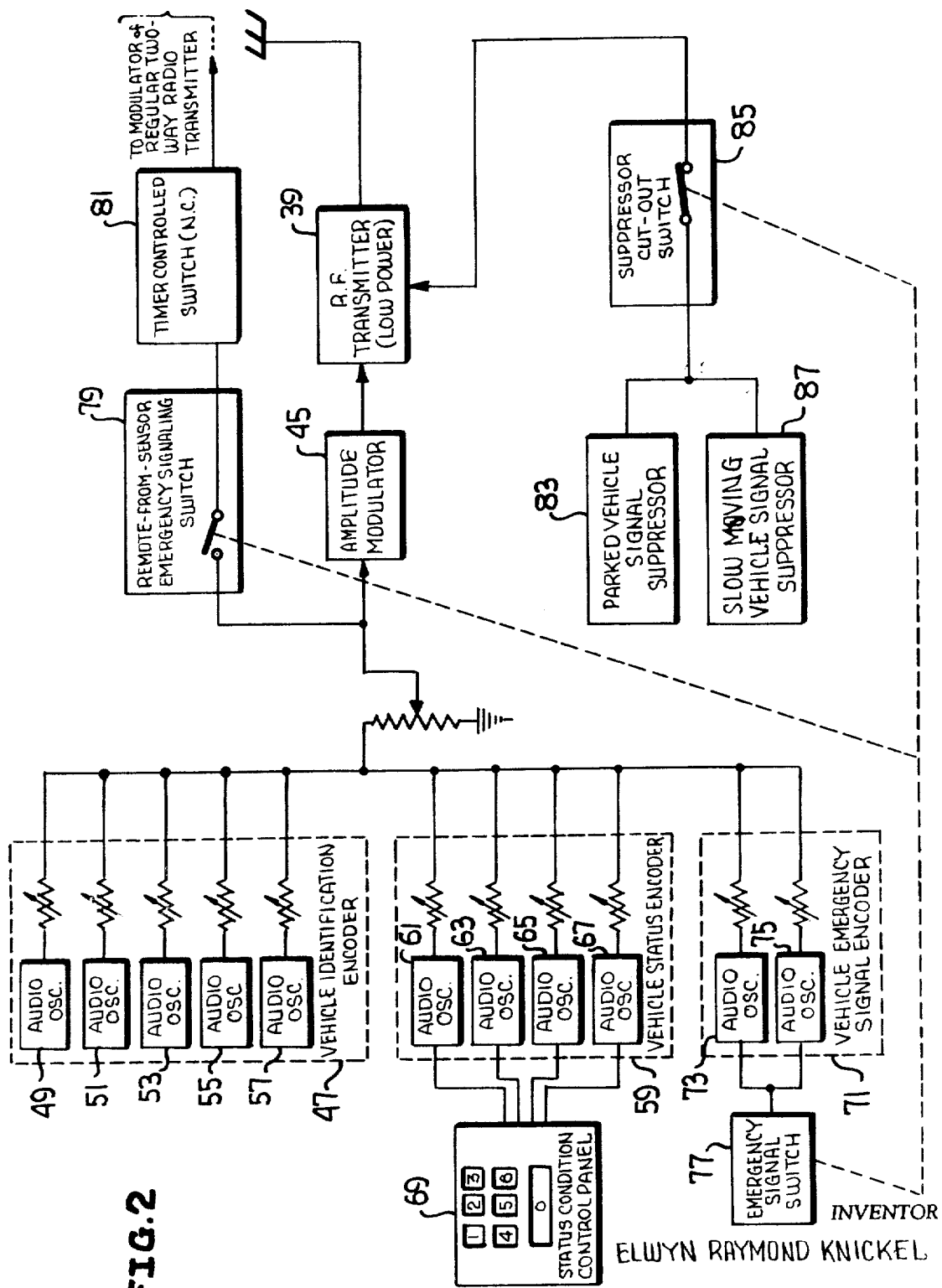

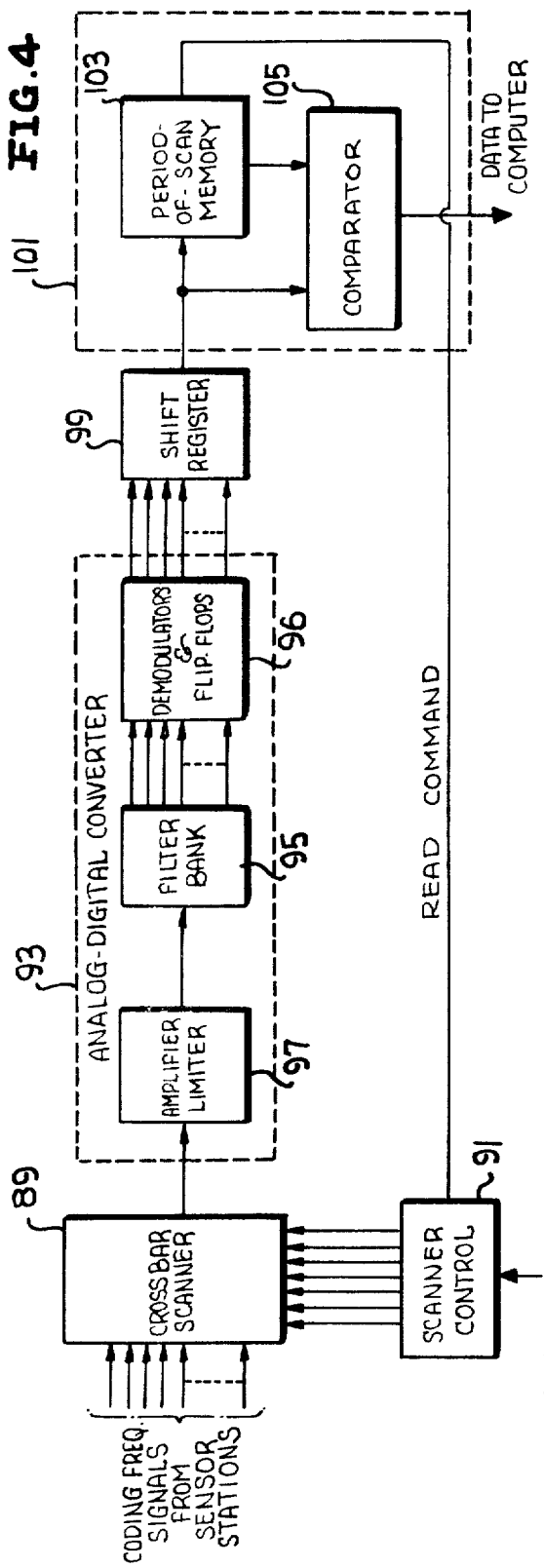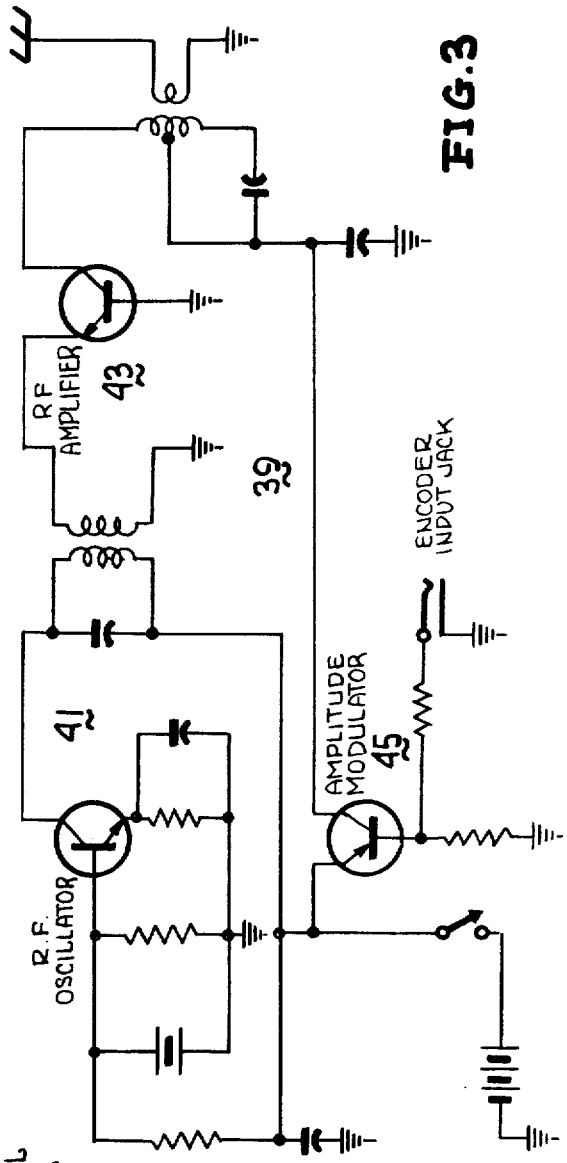

VEHICLE LOCATOR SYSTEM

BACKGROUND OF THE INVENTION

The present invention relates to systems for locating vehicles traveling within a prescribed area or over a prescribed route, and more particularly to a vehicle emitter-road side sensor system for police cars, passenger buses, taxicabs, freight trucks or other vehicles as a means of keeping track of their location, and in some cases their status, and also to provide the driver with the means of signalling a central dispatching station in the event of an emergency.

Administrative control of mobile police forces is a long existing problem which has received recent public articulation as a consequence of the recent incidents of civil disorder in our larger cities. Whenever a civil disturbance or disaster ties up a significant percentage of the available police force, those responsible for public safety would like to be able to tell at a glance just how their forces are deployed. This would permit intelligent redeployment of the forces so as to insure that adequate forces are dispatched to the scene of an emergency without inadvertently depleting large sections of a city of all police protection. The problem is increased somewhat by the fact that the radiofrequency spectrum has become severely congested making it necessary to minimize administrative messages between vehicles and the dispatching center.

At present the locations of various patrol cars within a city are known only to the extent that they are patrolling within a certain sector or beat. This usually means that the location of a patrol car is known only to within 1 to 3 miles, and because of this the car dispatcher in many cases will not assign a particular car to respond to an emergency call, but instead will request any car in the vicinity of an emergency to respond. This usually results in an unnecessarily large number of cars responding, providing more assistance than is actually necessary for the emergency involved, and leaving other sectors of the city unprotected. In other cases, however, the dispatcher assigns the patrol car which he thinks or has reason to believe is closest to the scene of the emergency, his belief being based on his knowledge of the beats or sectors which the respective cars are assigned to patrol. With this procedure, however, there are many instances where the closest car is not the dispatched car due to the fact that the dispatcher is unable to pinpoint the location of the various cars within their beats.

It would appear that the degree of sophistication achieved by high-precision radar techniques should make it possible to easily develop accurate car locators utilizing radar techniques. Unfortunately, patrol cars (and buses, taxicabs and similar vehicles of the type with which the present invention is concerned) generally operate in the vicinity of high buildings, water towers, radio towers and other high structures; therefore, conventional radar systems are rendered almost useless because of the multipath problem created by reflections of the signals from these high structures.

More significantly, however, any type of a radar or radio triangulation technique requires the utilization of significant portions of the scarce radiofrequency spectrum. The present invention employs a technique for car location which utilizes such a low-powered short range radiofrequency emitting device that the problem of finding suitable radiofrequency spectrum space is virtually eliminated.

It is therefore an object of the present invention to provide a system for locating vehicles traveling within a prescribed area.

It is another object of the present invention to provide a system which automatically detects the presence of one or more of a fleet of vehicles at a specified location within a prescribed area.

It is another object of the present invention to provide a system which automatically keeps track of the location of a fleet of vehicles traveling within a prescribed area.

It is another object of the present invention to provide a vehicle locator system which is capable of transmitting vehicle status and emergency information to a central vehicle dispatch office.

It is another object of the present invention to provide a vehicle emitter-street side sensor system for locating vehicles.

It is still another object of the present invention to provide a police patrol car locator system utilizing police call boxes to receive identification-coded signals transmitted from patrol cars within the vicinity of the callbox.

It is another object of the present invention to provide a vehicle locator system wherein a central dispatcher has available vehicle location information, vehicle emergency conditions, vehicle status conditions, and vehicle location with respect to schedule information.

SUMMARY OF THE INVENTION

The system of the present invention employs a coded emitter located in each vehicle and provides street-side sensors installed at preselected locations within the area being monitored. If the system is used as a police car locator system, the sensors could be installed in existing police callboxes. The emitter is a very low-powered RF transmitter designed for a limited transmission range. The transmitter of each car continuously radiates a signal which is coded to adequately identify each vehicle. As the vehicle passes a sensor, its presence is detected by reception of the coded identification signal. The identifying codes take the form of a combination of audio tones modulating the RF signal.

The low-power signal is demodulated at the sensor and the audio tones are automatically transmitted to a terminal center using, for example, regular telephone lines. At the terminal center, the signals received from a number of sensor stations are sequentially decoded and applied to a computer to provide information that a particular vehicle is passing a particular sensor location. The computer in turn drives a display map. Every time a vehicle passes a sensor, the decoded signal updates the car location memory file in the computer. The computer in turn drives the display map which shows the $X$ and $Y$ coordinates of each sensor station as a lamp which is lit in the presence of a vehicle at that sensor station. If desired, other vehicle status data, for instance, passenger loading, in the case of a bus, can also be displayed. It is possible to query the computer to determine the identity of any vehicle at a specified location, or conversely to determine the location of any particular vehicle.

While the invention as described below makes specific reference to police car and bus locator systems, it is to be understood that the vehicle locator system of the present invention is applicable to any type of moving vehicles where there is a need to monitor their location and/or status.

BRIEF DESCRIPTION OF THE DRAWINGS

The above and still further objects, features and advantages of the present invention will become apparent upon consideration of the following detailed description of the specific embodiments thereof, especially when taken in conjunction with the accompanying drawings, wherein:

FIG. 1 is a block diagram of the overall system of the present invention;

FIG. 2 is a block diagram of the vehicle emitter employed in the present invention;

FIG. 3 is a schematic diagram of the transmitter employed in the vehicle emitter of the present invention;

FIG. 4 is a block diagram of a vehicle identification decoder employed in the system of FIG. 1.

DETAILED DESCRIPTION OF THE PREFERRED EMBODIMENTS

Figure 5:
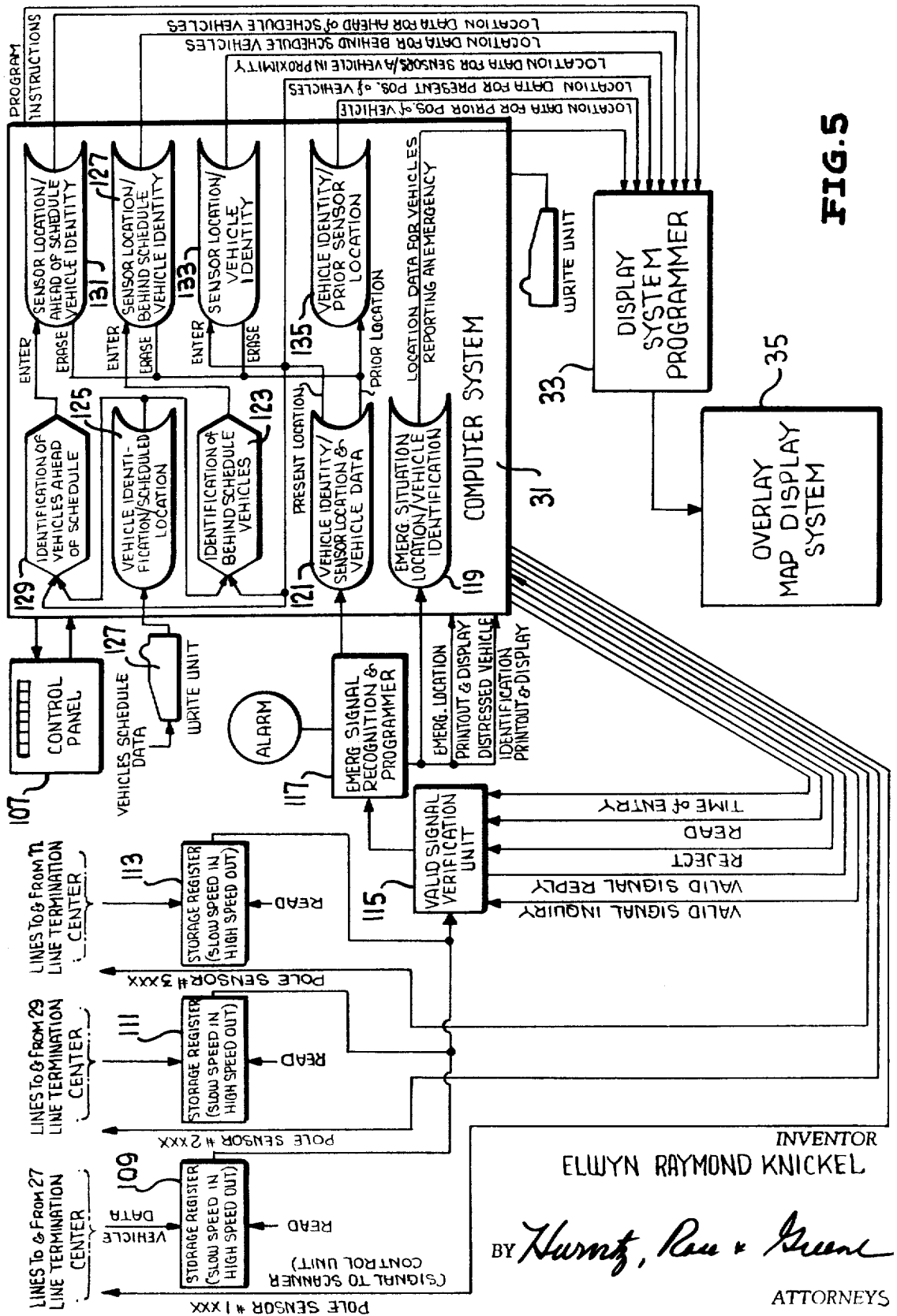
FIG. 5 is a block diagram of the central computer and display system employed in the system of FIG. 1.

Referring now specifically to FIG. 1 of the accompanying drawings, two vehicles 11 and 13 are illustrated as representing a fleet of vehicles (i.e., police cars, buses, taxicabs, etc.) whose locations are to be monitored. Each vehicle carries a coded emitter which transmits an RF carrier signal modulated by a specified combination of audiofrequency coding tones, the combination being unique to each vehicle. The emitter, to be described in detail below, is a very low-powered transmitter designed to be received within a limited range, for example, of less than 100 feet. Such transmitters can be operated without an FCC license on many frequencies, and because of their limited range do not contribute to the problem of spectrum congestion. The emitter of each vehicle continuously radiates a coded signal which identifies that vehicle.

Multiple sensor stations, exemplified by sensor stations 15, 17, 19, 21, 23 and 25, are disposed at preselected locations within a prescribed area through which vehicles 11 and 13 are to travel. For example, in the case of police cars, the sensor stations may comprise police callboxes located within the various beats or sectors to be patrolled by the fleet of patrol cars. Similarly, fire callboxes, traffic control boxes, or other public installations may be utilized as sensor stations, or in the alternative, special sensor station installations may be provided. In the case of buses, the street-side sensor stations would be spaced along the prescribed bus routes, and in the case of taxicabs the sensor stations would be disposed at preselected locations in the area within which the taxicab company is franchised to operate. As vehicle 11, for example, passes the location of sensor 17, its coded signal is received by a suitable receiver unit located in sensor station 17. The low-power signals received by the sensor stations are demodulated to recover the audiofrequency coding tones which are then automatically transmitted to sensor line termination centers 27 and 29. Termination center 27 is illustrated as receiving the coding frequencies signals from sensor stations 15, 17 and 19, whereas sensor line termination center 29 is illustrated as receiving the coding frequencies signals from sensor stations 21, 23 and 25. The number of sensor line termination centers provided, as well as the number of sensor stations feeding an individual termination center, depends upon the deployment of sensor stations in any given system. It is conceivable, for example, that all of the sensor line termination centers and the equipment located therein may be merged into a single unit located at a central control installation which may or may not be at the same location as the dispatcher. In the case of a police patrol car locator system, the police call boxes are often connected by telephone lines to the various police precinct houses located throughout the city. Accordingly, the present system, when used to locate police cars, contemplates utilization of these telephone lines in transmitting the coding frequencies from the callbox sensor stations to sensor line termination centers located within the precinct houses. In some cases, it may be possible to use the telephone lines in conjunction with carrier-derived circuits which can be superimposed on existing physical circuits such as fire and police cables without impairing the existing service. This carrier or radiofrequency technique is widely used in the field of telephony, radio and power line telemetry and control. In the field of telephony, a significant portion of all trunk and subscriber circuits are carrier derived without impairment of the physical services and at a cost well below that which would result from the utilization of additional physical circuitry.

At sensor line termination centers 27 and 29, the coding frequencies signals are sequentially scanned and decoded to provide information that a particular vehicle has passed the sensor station being scanned. The decoded information is then fed to a computer 31. Every time a vehicle passes a sensor, the decoded signal updates a vehicle location memory file in the computer. The computer in turn drives a display programmer 33 which correlates computer information applied thereto to light appropriate lamps on a display map 35. Each of the lamps on map 35 corresponds to a sensor stations location and is lit in response to the sensing of a vehicle at its respective sensor station. As will be described in detail below, other vehicle data, for example, passenger loading in the case of a bus, may also be displayed. By means of a control panel 37 the dispatching officer can interrogate the computer to determine the identity of a vehicle known to be at a given location, or conversely to determine the last reported sensor station location of a particular vehicle at any time.

Referring now to FIG. 2, there is illustrated a block diagram of a typical vehicle emitter device which is carried by all of the vehicles (11,13) in a fleet of vehicles being monitored by the system of the present invention. A low-power radiofrequency transmitting device 39 is employed as the emitter, and may be essentially the same device as that which is found in widespread use in radio-controlled garage door opening systems. An example of a suitable transmitter is illustrated schematically in FIG. 3 and comprises a radiofrequency transistorized oscillator 41 feeding an RF transistor amplifier stage 43. The emitter provides an extremely low-power signal, for example, 100 milliwatts power into amplifier stage 43, so that no FCC licensing would be required on many frequencies. A typical frequency for oscillator 41 would be 27.255 MHz. A prime consideration is the selection of an RF frequency that is not subject to high level interference from transmitters which may be located nearby. The method of coding employed, described in detail below, would however allow operation in the face of moderate levels of interference. The size of the solid state transmitter illustrated in FIG. 3 could by way of illustration be packaged in a 4" × 2" × 1" box.

A transistorized amplitude-modulator 45 (FIGS. 2 and 3) serves to amplitude-modulate the RF carrier frequency with coded audio tones. Alternatively, a system employing frequency modulation may be employed where such is preferable; however for purposes of the present system, amplitude-modulation is presumed.

In systems in which it is impractical to provide separate transmitters for vehicle location purposes, it is within the scope of the present invention to employ the low level stages of the regular vehicle communications transmitter as the emitter transmitter 39. The coding techniques described below are equally applicable to such a modification.

Coding of the emitter signal to provide requisite vehicle identification requires only a relatively few bits of information from the standpoint of information theory, and could be accomplished by time-division pulsing of an audio tone used to modulate the emitter signal. However, telephone lines have more information capacity than is needed; thus, in the case of a system in which the sensor stations and sensor line termination centers of FIG. 1 are connected by telephone lines, the extra information capacity can be traded for design cost and simplicity. Consequently, I have chosen to utilize multifrequency signalling to accomplish coding of the RF signal.

Multifrequency signalling could be accomplished by using a large number of signal tone identification codes or by utilizing multitone codes. Since signals of a simple structure such as single tone codes are easily imitated by speech, some form of multitone code that would be difficult to imitate is desired. Two tones or more bearing a nonharmonic relationship to each other are adequate for this purpose, since the multiple frequencies present in normal speech are generally harmonically related.

Selection of the tones to be utilized requires special consideration. It would be desirable for the sake of simplicity to limit the number of coding tone oscillators in the encoders to as few as possible. The utilization of a multitone code to avoid signal imitation on the one hand, and the requirement to keep the number of tone oscillators per emitter to a minimum on the other hand, resulted in my utilizing a $P$-out-of-$N$ code approach. The number of different combinations, $n$, that can be obtained in a $P$-out-of-$N$ code is given by equation (1):

$$n = \frac{N!}{P!(N-P)!} \qquad (1)$$

where $N$ is the total number of tones available, and $P$ is the number of tones that would be utilized as a combination to form an identification code. A 3-out-of-12 code, for example, would yield a maximum number of 220 different codes, which would be adequate for a police vehicle location system in a city having less the than 220 patrol cars. Naturally, where greater numbers of vehicles comprise the fleet being monitored, different $P$-out-of-$N$ codes could be employed. A 5-out-of-17 code yields 6,188 combinations, for example. In FIG. 2, five different oscillators 49, 51, 53, 55 and 57 are employed in the vehicle identification encoder unit 47, and a 5-out-of-17 identification code is assumed. The oscillators 49, 51, 53, 55 and 57 are plug-in type oscillators, each having a different frequency. The five frequency combination chosen for any vehicle in the fleet is unique to that vehicle so that the five-tone vehicle identification signal which amplitude-modulates the carrier signal generated in transmitter 39 is sufficient to identify the particular vehicle from which the carrier signal emanates.

In addition to the identification code oscillators employed in vehicle identification encoder 47, each emitter may have a limited number of additional tone oscillators for special signalling purposes or to automatically provide status information. Thus, for example, a vehicle status encoder 59 is illustrated in FIG. 2 and includes four audio oscillators 61, 63, 65 and 67 which are normally deenergized and are selectively actuable from a status condition control panel 69 located within the vehicle. If there are, for example, six different vehicle status conditions which could conceivably be relayed to central dispatcher office, a 2-out-of-4 frequency code may be employed whereby each of six separate buttons or levels at control panel 69 selectively actuates a different combination of two of the oscillators 61, 63, 65 and 67. Depending upon the number of status conditions to be relayed to the central dispatcher, 1-out-of-4, 2-out-of-4, 3-out-of-4 and 4-out-of-4 type codes could be employed utilizing the four oscillators of vehicle status encoder 59. If necessary, of course, additional oscillators may be employed to permit communication of an even greater number of vehicle status conditions. The frequencies of the four status code oscillators cover a different frequency range than the 17 identification code oscillators in identification encoder 47.

A further encoder unit, namely the vehicle emergency signal encoder 71 is provided and comprises a pair of audio tone oscillators 73 and 75. These oscillators are of different frequency than the 17 identification code oscillators and the four status code oscillators, and are normally deenergized but are selectively actuable by means of emergency switch 77 located within the vehicle. Presence of the emergency tones in the modulation signal of a vehicle emitter signifies an emergency condition requiring immediate attention by the dispatcher officer.

Another aspect of frequency selection for the various oscillators in encoder units 47, 59, and 71 concerns the spacing of the coding frequencies. It is conceivable that in a particular system, nonlinearities of various parameters could result in generation of strong second and third harmonic components of the modulation signals. It is important therefore that of the 23 possible modulation frequencies, none has a second or third harmonic relationship with any other modulation frequency. By utilizing geometric spacing between the tone frequencies, it is possible to select tones such that the second and third harmonics of all the lower frequency tones are approximately midway between the higher frequency tones in the same series. Another advantage of geometric spacing of between coding frequencies is that the spacing between any two adjacent tones is always a constant percentage of the lower tone. This simplifies design and makes it possible to use inexpensive electrical tuning elements in both the coding oscillators and the decoding units. The general equation for geometric spacing of tones is given by equation (2) as follows:

$$t_n = a^{n-1} t_1 \qquad (2)$$

where $t_n$ is the $n$th tone in a geometric series and $a$ is the ratio of $t_{n+1}$ to $t_n$. This produces a constant percentage spacing $P$ between adjacent tones, given by equation (3) as follows:

$$P = 100(a-1) \qquad (3)$$

A geometric spacing of $P = 11.11$ percent results in a fairly good interlacing of second and third harmonics between fundamental frequencies of the higher tones.

It is to be noted that the oscillators comprising the vehicle identification encoder unit 47 would always be operational so that the vehicle could always be tracked by the system as it passes various sensor stations. On the other hand, the oscillators in the vehicle status encoder unit 59 and vehicle emergency signal encoder unit 71 are selectively actuable as required to communicate the desired information. Actuation, for example, could be effected by selective application of $B+$ energy to the respective oscillators.

During utilization of the present system, a situation may be encountered in which the vehicle operator wishes to signal for emergency assistance at a time when the vehicle is standing out of receiving range of the nearest street-side sensor station. There are a number of methods for coping with this problem. The choice of the method employed for a given situation will depend on the availability of equipment, the operating frequency of the emitters, and possible FCC rule changes. If a police car, bus or taxicab fleet is equipped with two-way radios, for example, the multitone modulation coding signals normally applied to amplitude modulator 45 may be selectively applied to the modulator circuit of the transmitter unit of the vehicle's normal two-way radio equipment. This is accomplished in FIG. 2 by means of the normally open remote-from-sensor-emergency signalling switch 79 which is closed upon actuation of emergency signal switch 77. A timer control switch 81 is provided in series between the remote-from-sensor-emergency signalling switch 79 and the modulator of the vehicle two-way radio transmitter. Timer control switch 81 is normally closed and is set to open a specified time, for example 2 minutes, after the emergency switch 77 is actuated. Thus, for a specified period, for example 2 minutes, the vehicle two-way radio transmitter carrier signal would be modulated by the same signal which modulates the RF signal generated in transmitter 39. A decoder unit would be provided at the central dispatching center to identify the vehicle requesting assistance. A computer inquiry could then be made to find the last reported position of the vehicle as recorded in the computer memory.

If the bus or taxicab does not have a two-way radio unit, a simple device could be installed in the vehicle for radioing the emergency signal to the dispatcher center. This would be a transmit-only device and its cost would be much less than that of a comparable two-way radio unit. The carrier frequency of such unit would be modulated in the same manner suggested above for the carrier frequency of the two-way radio transmitter, and would therefore be employed in conjunction with switches 79 and 81 as described above.

A third possibility that might be employed would be to have a booster amplifier that could be switched in to amplify the normal modulated-carrier signal provided at the output of transmitter unit 39. The booster amplifier would selectively increase the range of the emitted signal to that necessary for the signal to reach at least one sensor station regardless of where in a city the vehicle might be parked. Since this amplified signal would most likely be picked up by several sensor stations, it would be necessary to impart a special characteristic to the signal so that it would not be used by the system for updating the computer vehicle location files. This, as will be described subsequently, could cause a problem in maintaining accurate location records of the specific vehicle. Rather, the specially characterized signals would be used to identify the vehicle only and the vehicle location would be determined by making an inquiry into the computer to obtain the last previously reported location of the vehicle. The feasibility of utilizing this last technique would depend upon the selected operating frequency of the emitters in order to avoid violation of FCC rules.

Situations can be expected to occur where several emitter-equipped vehicles would be parked or remain standing in the vicinity of the same sensor station for extended periods of time. Under such circumstances, without preventative measures being taken, the sensor station would receive a signal containing more than five identification code audio tones as well as intermixed status code tones from the two or more standing vehicles. As will be described later, the system is provided with a unit for rejecting any signal containing less than or more than the requisite number of identification code tones. The information would thus be disregarded by the system and the location of the standing vehicles would not be recorded.

The standing vehicle identification feature of the present invention overcomes the problems resulting from the presence of multiple standing vehicles in the vicinity of a single sensor station by pulsing the vehicle emitter at a slow random rate with a very low duty cycle any time the vehicle is stopped. For example, the emitter of a vehicle may be pulsed for approximately 2 seconds out of every 3 minutes whenever the vehicle is in a parked position. Consequently, the probability of two vehicles at the same location pulsing their emitters at the same time is quite low. Should two standing vehicles happen to pulse their emitters at the same time, they will not continue to pulse at the same time since the pulsing is done in a random manner. The feature is accomplished through the parked vehicle signal suppressor unit 83 which can apply a voltage to transmitter 39 via suppressor cutout switch 85 to inhibit the transmitter except during the period of random pulsing. By way of example, parked vehicle suppressor unit 83 may be a gating circuit which applies an inhibit signal to transmitter 39 whenever the vehicle is parked, the inhibit signal being gated on and off by random noise generator or similar device for randomly generating a gating signal. The inhibit signal, by way of example, could deactivate transmitter 39 by interrupting B+ to oscillator 41 (FIG. 3). Unit 83 could be actuated by means of a switch attached to the vehicle gear shift such that whenever the shift is in the parked position the emitter is randomly pulsed. Another possibility, which is more applicable in the case of buses, is to have unit 83 turned on by the brake light system, but with a built-in delay of a predetermined time. For instance, the pulsing mode of the emitter can be made to commence only after the brake light has been on continuously for a period of 10 seconds. Since the vehicle moves only a few feet during the first few seconds after it starts up, the emitter is made to remain in the slow pulsing mode for the first several seconds after the vehicle begins to move.

The suppressor cutout switch 85 is ganged to the emergency signal switch 77, and prevents application of the inhibit signal from unit 83 to transmitter 39 any time the emergency switch 77 is set to indicate a vehicle emergency. The purpose for this, of course, is to permit continuous transmission of emergency signalling information when a parked vehicle encounters an emergency condition.

A problem similar to that created by multiple standing vehicles in the region of a sensor station arises when a group of vehicles, which happen to be bunched together, moves slowly past a sensor station. Again, simultaneous reception of coding signals from more than one vehicle by the system would result in a failure to record data for any of the vehicles. The parked vehicle signal suppressor unit 83 does not solve this problem since it only is actuated when the vehicle is parked. Fortunately, however, as the vehicles pick up speed, they have to increase their relative spacing so that once they exceed approximately 15 miles per hour, the probability of even two vehicles being within the range of a sensor at a given time is very low. Therefore, the problem may be alleviated by pulsing the transmitter in a manner similar to the pulsing provided by parked vehicle signal suppressor 83, but in this case at a somewhat higher rate. To accomplish this the slow moving vehicle signal suppressor unit 87 is provided, and when actuated applies an inhibit signal through suppressor switch 85 to transmitter 39 to turn off the latter. The inhibit signal from unit 87 may be set to pulse for 1 second out of every 6 seconds and would thereby alleviate problems resulting from a cluster of vehicles moving below 15 miles an hour in the region of a single sensor station.

Each sensor station 15, 17, 19, 21, 23 and 25, of FIG. 1 comprises a small solid state superheterodyne receiver of the type utilized with automatic garage door openers, or if frequency modulation is employed, a comparatively simple FM receiver can be employed. A typical receiver unit could be compactly constructed (for example, 9" × 3" × 3") and would draw approximately 25 milliamperes at 27 volts. Power for such a receiver could be supplied directly over the telephone lines interconnecting the various sensor stations with the sensor line termination center. The coded audio tone combination signal from each sensor station, denoted CODING FREQUENCIES in FIG. 1, is fed through appropriate DC blocking capacitors to a sensor line termination centers 27 or 29 as the case may be. Each CODING FREQUENCIES signal thereby comprises a group of superimposed audio tones corresponding to those tones modulating the RF carrier signal produced at transmitter 39 in FIG. 2.

Referring now to FIG. 4 of the accompanying drawings there is illustrated a block diagram of a typical identification signal decoder located in each sensor line termination center and which responds to the CODING FREQUENCIES signal to provide digital data suitable for utilization at computer 31. The sensor line termination center (27 or 29) would logically be located in the police precinct houses for a police car locator system of the type hypothesized. Under such circumstances, the decoder unit or units at each precinct house receives CODING FREQUENCIES signals from callboxes (sensor stations) located within the respective precinct area. For other types of vehicle locator systems, however, it is conceivable that one central line termination center may be provided to which information flows from all of the system sensor stations, and at which all of the CODING FREQUENCIES signals are decoded.

Regardless of the location of the sensor line termination centers, by utilizing familiar time sharing techniques well known in computer technology, the CODING FREQUENCIES signal signals provided from a multiplicity of sensor stations can be processed in a relatively small number of decoding units. By command from the display computer 31 at the dispatching center, the decoder unit or units (FIG. 4) at each sensor line termination center (27, 29) may be rapidly and sequentially switched from one set of sensor station terminals to another in a repetitive scanning manner. If 1,150 Hz. is the lowest coding tone frequency utilized, and if a spacing percentage P of 11.11 is provided between tones, a spacing of 127 Hz. exists between 1,150 Hz. and the next higher tone in the vehicle encoder. Under these conditions, a sampling rate of as high as 60 sensor stations per second could easily be attained. Since the average precinct in Washington, D.C., for example, has less than 80 callboxes associated therewith, a police car locator system for that city need employ no more than two decoders in each precinct to allow each callbox to be sampled 1½ times per second. At this rate, a patrol car equipped with an emitter and traveling at a rate of speed as high as 90 miles per hour would not be able to slip by a callbox sensor undetected.

In FIG. 4 the CODING FREQUENCIES signals from the various sensor stations are illustrated as applied directly to multiplexing unit 89. The multiplexing unit is required to time share application of the CODING FREQUENCIES signals from the various sensor stations to the analogue-digital converter unit. Multiplexer unit 89 is preferably a crossbar switch scanner of the type disclosed in bulletin 131 issued by the James Cunningham, Son & Company, Inc., Honeoye Falls, N.Y., York, Copyright 1960. Alternatively, the multiplexer unit 89 may be a matrix of solid state gates of the type disclosed and discussed in Ledley, Robert S., Digital Computer & Control Engineering, McGraw-Hill, 1960, pp. 547—552. Multiplex converters utilizing solid state switching elements can operate at high scanning rates but require high level signals. Crossbar scanning units, on the other hand, operate at lower scanning rates but can operate at lower level signals. Crossbar scanning units are limited to rates of 60 to 100 scans per second, which is sufficient for most vehicle locator system applications. A scanner control unit 91 is slaved to the central computer 31 which determines the scan program and rate. The scanner control unit 91 provides control signals and dwell time information to the crossbar scanner unit 89. Dwell time is the period during which the scanner unit 89 connects one of the CODING FREQUENCIES signals received from the sensor station to the analogue-to-digital converter unit 93. Dwell time for a typical system may be of the order of 10 milliseconds, which is sufficient to allow several cycles of even the lowest frequency coding tone to pass through filter bank 95 in the analogue-to-digital converter unit 93. The CODING FREQUENCIES signals sequentially applied via crossbar scanner 89 to unit 93 are fed to an amplifier limiter unit 97. It is a characteristic of extreme instantaneous limiters that they accentuate differences in levels between components of a multifrequency signal. This may be used to provide guard action, that is, to reduce the probability of false response of the decoding unit of FIG. 4 to speech or other unwanted signals.

Filter bank 95 contains a set of filters, each of which is designed to pass only a respective one of the code frequency tones being utilized. The filter bank thus contains one filter section for every one of the possible identification code tones, plus all of the possible vehicle status tones and emergency signal tones. Thus, if used in conjunction with the vehicle emitter of FIG. 2, filter bank 95 would require 23 sections (that is, 17 I. D. sections, four status sections, and two emergency sections). The output signals from filter bank 95 are fed to a demodulator and flip-flop unit 96. More specifically, each filter section in filter bank 95 feeds a respective detector-demodulator, the latter providing a signal only in response to passage of a code tone through its associated filter section. For example, each detector-demodulator may comprise a series connected diode and capacitor acting as a peak detector circuit. The detector-demodulator output signal drives a respective flip-flop which is stable in one state (off) in the absence of an input signal and stable in its other state (on) in the presence of an input signal. The output signals from the various flip-flops are fed to respective stages of a shift register 99 to set up a binary number in the latter. Every flip-flop which has been switched on by detection of its associated code tone sets up a binary one state in a corresponding stage in the shift register 99. In one embodiment of the present invention, at the end of the dwell time (that is, at the end of the period during which an individual CODING FREQUENCIES signal from a respective sensor station is applied via the crossbar scanner 89 to the analogue-to-digital converter 93), the scanner control unit 91 could provide a "read" signal to the shift register 99. The binary number in the shift register could then be read out for transmission to the central computer 31. However, in accordance with another feature of the present invention (the "dual look" feature) the readout of the decoded information is delayed until the information can be checked during the next scan of the same sensor station. This adds significantly to the false signal rejection capability of the system. More specifically, the basic design of the system provides a high degree of false signal rejection in that it automatically rejects any vehicle identification signal having less or more than the specified number of tones. This is provided for by the valid signal verification unit discussed in relation to FIG. 5, infra. In addition, the nonharmonic relationship between the audio tones employed for vehicle identification greatly reduces the probability that a spurious voice signal will give a false vehicle identification signal. Further, the limiting action of the amplifier limiter unit 97 provides a degree of guard action against false signals. However, the "dual look" comparison feature provided by unit 101 provides a still higher degree of false signal rejection. Since the various sensor stations are scanned at a relatively high rate, each vehicle emitter signal received by a sensor station is sampled at least twice during the time that even a fast moving vehicle remains within transmission range of any given sensor station. Fortunately, false signals such as those which might result from voice crosstalk and most types of noise have a rapidly varying characteristic. Consequently, the false signals they generate usually vary from one scan or sample of a sensor station signal to the next. The "dual look" feature provides for continuously comparing the signals of two successive scans from each sensor station. This is accomplished by feeding the output signals of shift register 99 through a memory circuit 103 which delays readout of the shift register information to the computer for a period of time that is precisely equal to the period of time between successive scans of each sensor station. The shift register output of the current scan is then fed as an input signal to comparator unit 105 and the shift register output signal from the previous scan of the same sensor station is fed from the period-of-scan memory unit 103 as another input signal to comparator 105. Comparator 105, for example, may be a plurality of AND gates arranged to gate each information bit in shift register 99 with a corresponding information bit in period of scan memory 103. Should either or both of the signals (each of which includes a plurality of bits of information) from successive scans of a sensor station have been the result of noise or interference, it is highly improbable that the two signals entering the comparator would contain the proper number of tones and be sufficiently similar to provide a valid identification code; that is, one containing exactly five tones. If an invalid signal, that is, one containing more or less than five tones is received, the valid signal verification unit (infra, see FIG. 5) would reject the information. In other words, the comparator unit 105 passes to the computer only those bits of information which are identical upon successive scans of the same sensor station. If the output of the comparator unit 105 does not indicate the presence of the proper number of identification code tones, the signal will be rejected by the valid signal verification unit.

Although the "dual look" feature is illustrated as being accomplished at the line termination center, this function, as well as the entire decoding operation, could readily be performed by the computer 31 at the central dispatcher station. For some system applications, it may be preferable to have this function performed subsequent to the valid signal verification check.

It is to be noted that the binary number in shift register 99 might in fact be three or more numbers or words, one word representing vehicle identification, another word representing vehicle status, another word representing vehicle emergency situations, etc. Commercially available disc-type memory units, not illustrated, capable of storing 348,000 16-bit words, are adequate for storing all the data required for servicing over 1,000 sensor stations. A maximum of two telephone lines are required from the line termination centers to the central computer. One telephone line carries the timing and sequence signals from computer 31 to the scanning control unit 91, and the second telephone line carries the data from the line termination centers (27, 29 for example) to computer 31 and in turn to display unit 35.

The vehicle locator central computer and display portion of the system is illustrated in block diagram form in FIG. 5. The major components of this portion of the system are the signal transmission lines running to and from the line termination centers, the computer 31, the display system programmer 33, and the control and status panel 107. Computer 31 could conceivably time share an existing computer if one is available with sufficient capacity. If a suitable computer is not available, the vehicle locator system could use any one of many low priced small computers commercially available. It is important to point out that the computer functions described below are not intended to require novel computer components nor novel computer programming techniques. With regard to programming, the system operation described below, as relates to computer function, can readily be achieved within the present state of the programming art.

The output data in parallel binary form provided by comparator 105 at the line termination center is fed to a respective storage register associated with the line termination center from which the data originates, the storage registers being located at the central dispatcher station. For purposes of FIG.

5, the computer system is shown receiving data from three different line termination centers and consequently three respective data storage registers 109, 111 and 113 are provided to accommodate data from respective line termination centers 27, 29 and n. The computer continuously scans or polls each of the line termination centers. With each scan, the computer reads out the latest vehicle location information that has been stored in the storage register 109, 111 or 113 for the particular line termination center. For example, upon readout of the data in storage register 109, the computer signals line termination center 27 to program a scan of its next sensor station. While the scan by line termination center 27 of its next sensor station is taking place, the computer moves on to read out the data in storage register 111. Upon readout of this register, the computer signals line termination center 29 to program a scan of its next sensor. By the time the computer has completed its scan of the registers for all succeeding line termination centers (here register 113 for termination center n), line termination center 27 will have completed the scan of its next sensor station and any vehicle location data it is receiving will again be stored in register 109. The computer reads out the data in register 109, directs line termination center 27 to program the scan of its next sensor, and the whole process is repeated over again on a continuing basis.

Upon readout of each terminal register, the vehicle data is checked for validity by checking the proper number of binary ones representing tones in the vehicle identification code. This is performed in the valid signal verification unit 115. If the number of identification tones received is incorrect, the computer rejects the data. If it is correct, the computer calls for the readout of the data and inserts a time of entry. Although unit 115 for performing this function is shown separately for the purpose of explanation in FIG. 5, the identification verification functions would normally be performed within the computer 31 itself.

The input data in the form of a parallel binary word or words is next checked for the presence of an emergency situation by the emergency signal recognition and programmer unit 117. If an emergency tone combination is received by a sensor station, respective flip-flops in unit 96 (FIG. 4) are switched to their binary one state and the appropriate stage in shift register 99 is similarly switched to its binary one state. The emergency data bits are then fed to the appropriate storage register (109, 111, 113, etc.) and eventually to unit 117. Detection of the binary one emergency bits causes an alarm to be sounded, and the computer automatically prints out and displays the location and identity of the vehicle reporting the emergency. Unit 117 also passes location and vehicle identification data regarding all emergency events to the emergency situation memory unit 119 in computer 31.

In the event that the emergency signal has been received over a radio communications link in a system employing the optional remote situation emergency alarm feature discussed above in relation to switch 79 in FIG. 2, the emergency signal recognition and programmer unit 117 recognizes the source of the signal and automatically directs the computer 31 to search its memory files and print out and display the last reported location of the vehicle reporting the emergency. Again, conventional logic circuitry may be readily employed to provide these functions.

For facility in explanation, the computer 31 is divided up into different functional areas. For example, the emergency situation location/vehicle identification unit 119 keeps track of all locations at which emergency situations exist on the basis of information received from emergency signal recognition and programmer unit 117. Unit 119 also keeps track of the identity of the vehicles involved in the emergency. Unit 119, like the other memory files to be described infra is a conventional computer memory file, such as a disc-type memory, and is required in any car locator system where there is a likelihood of more than one emergency occurring at any given time.

Another memory file in computer 31 is the vehicle identity/sensor location and vehicle data file 121. This is a file by vehicle identity of the last reported location of each vehicle. The input data to file 121 is received from respective data storage registers 109, 111 and 113 via the valid signal verification unit 115 and the emergency signal recognition and programmer unit 117. File 121 keeps track of the present location (on the basis of sensor station) of each vehicle in the fleet. Signals representing this data are provided to other units within the computer 31 as described below.

An identification of behind schedule vehicles unit 123 is employed to identify behind schedule vehicles in systems where vehicles (such as buses) are to traverse a prescribed route in accordance with a time schedule. The function performed by unit 123 is to compare each vehicle's actual location, as determined by memory file 121, with vehicle schedule information received by unit 123 from memory file 125, the vehicle in identification/scheduled location file which stores vehicle schedule information received from a schedule write-in unit 126. Unit 123 thus compares each vehicle's actual location with its scheduled location, and when any vehicle is behind schedule by a predetermined amount of time, data concerning that vehicle is fed from unit 123 to memory file 127. Memory file 127 is a sensor location/behind schedule vehicle identity file. This is a file by sensor station location of all vehicles more than a given number of minutes behind schedule. File 127 provides an output signal to the display system programmer 33 for indication on display map 35 at each sensor station location at which a vehicle is overdue. In addition, the computer may upon request selectively provide a readout of all vehicles which are behind schedule by the predetermined amount of time.

In like manner a unit 129 is provided for identification of vehicles which are ahead of schedule. Unit 129 receives information from memory file 125 and from memory file 121, compares actual vehicle location with scheduled vehicle location, and provides an output signal indicating which vehicles are ahead of schedule and the locations of such vehicles. The output signal from unit 129 is fed to memory file 131 which is a sensor location/ahead of schedule vehicle memory file for providing sensor station location information for ahead of schedule vehicles to the display system programmer and which may be selectively queried with regard to those vehicles which are ahead of schedule at any time.

There is also provided a memory file 133, denoted as the sensor location/vehicle identity file. This is a file by sensor station location of all vehicles last reported in the proximity of each sensor station. This file 133 differs from memory file 121 in that the latter is a file by vehicle identity, whereas the former is a file by sensor station location. Both memory files 121 and 133 provide respective data signals to the display system programmer 33 representing location data for present position of vehicles and the location data for sensor stations with a vehicle in proximity.

Computer system 31 is provided with still another memory file, denoted as the vehicle identity/prior sensor location file 135. This is a file by vehicle of the location that each vehicle was at prior to its present location. Information for file 135 is received from the vehicle identity/sensor location file 121. Memory file 135 continues to list the previous location of each vehicle regardless of how long it stays at its next sensor station.

The display system programming unit 33 may take any one of several forms. However, for purposes of illustration unit 33 is assumed to be a crossbar switch (of the type similar to the crossbar scanner 89 discussed above in reference to FIG. 4) with associated programming, translating and buffering circuitry such that unit 33 is able to accept routing information from the computer in binary coded decimal form to bring about contact closures in the crossbar switch and turn on lamps in the overlay map display 35 as directed.

For the most part, the functions of the various units within the computer system are adequately described above. Some discussion, however, of how vehicle location updating occurs is in order to provide a clearer understanding of system operation. This can best be described by means of an example:

Assume that vehicle 11 is in the proximity of sensor station 17. Further assume that vehicle 11 is a bus and that the driver has the vehicle status encoder unit 59 set to indicate that the bus is filled to capacity (as by selecting the proper status button on control panel 69). When sensor station 17 is scanned by its respective scanner 89, the identification and status information for vehicle 11 is fed to computer 31. The computer then searches a sector assigned to vehicle 11 in the vehicle identity/sensor location memory file 121. Assume that the vehicle 11 sector of memory file 121 already shows sensor station 17 as the location of vehicle 11. In this case, the vehicle status data and the latest time of entry are fed to the vehicle 11 data memory sector in file 121 for updating purposes. In addition, a signal is applied via display programmer 33 to the display map 35 to light the lamp representing sensor station 17. Since this display lamp would already have been lit upon a previous scan of sensor station 17, no further updating takes place within the computer.

Now, assume that vehicle 11 moves out of range of sensor station 17, heading towards sensor station 15, but not yet within range for reception of its emitter signal by sensor station 15. During the next scan period of sensor stations 15 and 17, no vehicle encoder signal information from vehicle 11 is received and relayed to computer 31. Consequently, all information in the computer relative to vehicle 11 remains the same. The location display lamp corresponding to sensor station 17 remains lighted because sensor station 17 is still the last reported location of vehicle 11. An explanation for how this is achieved is provided infra.

Assume now that during the next scan of the sensors, the polling of sensor station 15 indicates that vehicle 11 is in its proximity. Again, the sector assigned to vehicle 11 in the memory of the vehicle identity/vehicle location and data file 121 is searched. A comparison is made between the sensor station now being reported (sensor station 15) for vehicle 11 and the previous information stored (sensor station 17) in the vehicle 11 memory sector. Since the memory sector shows vehicle 11 at a different location than that indicated by the data now being received, four things occur: one, the present location and data along with the time of entry is fed into the vehicle 11 sector of the vehicle identity/sensor location and vehicle data file 121; two, the previous location data on vehicle 11 is fed into the vehicle 11 sector of the vehicle identity/prior sensor location file 135; three, vehicle identification data for vehicle 11 is fed into the sector of the memory in the sensor location/vehicle identity file 133 allocated to sensor location 15; and four, vehicle 11 identification data is fed, for erasure purposes, to the sector of the memory in the sensor location/vehicle identity file 133 allocated to sensor station 17. Without this erasure step, the memory sector assigned to sensor station 17 would continue to show vehicle 11 even after it has moved on to another sensor location.

Assume now that the last reported location of vehicle 13 is sensor station 17. This information is stored in the memory sector allocated to sensor station 17 in the sensor location/vehicle identity file 133. Since the sensor station 17 memory sector still contains identification data on one vehicle (vehicle 13), the display lamp corresponding to the location of sensor station 17 on map 35 remains lighted, even though vehicle 11 has passed on to sensor station 15. If, on the next scan of sensor station 19, vehicle 13 identification data is received indicating that vehicle 13 is now in the proximity of sensor station 19, then by the process just described, the vehicle 13 identification data is erased from the sensor station 17 memory sector of the sensor location/vehicle identity file 133. If this step clears the sensor station 17 memory sector of the file 133 of all vehicle identification data (as we assume here), indicating that sensor station 17 is no longer the last reported location of any vehicle in the fleet, then the display lamp corresponding to sensor station 17 on map 35 is extinguished.

The particular overlay map display system is not the only method of displaying vehicle location for a system of the type described. Various cathode ray tube displays might also be employed for example. The map overlay type of display is, however, a very feasible and straightforward way of displaying the system information. The following description is based on the use of a lighted overlay map display system.

One type of map overlay display board utilizes miniature 1 watt lamps that do not require a baffle to keep the illumination from the individual lamps from spreading. The 1 watt lamps are placed directly against the rear side of the status maps. These lamps include a plastic lens in the ferrule assembly which sharply focuses light image and at the same time prevents lateral spreading. Three color-coded lights may be held in a molded nylon holder, approximately ½' × 1½', which snap-fits into a perforated grid behind the status display map. Approximately 250 of these lights can be mounted in 1 square foot of display space. The grid for a 4' × 6' display would be capable of holding about 1,000 lights.

A 4' × 6' display board of this type used to display a 4 mile by 6 mile sector of the city would make it possible to place the display lights so as to have a display accuracy of plus or minus 150 feet. A cluster of six lights for each sensor station, arranged in a hexagon, could be placed to provide a display accuracy of plus or minus 450 feet for each light. Six lights would be needed for example where a relatively large number of status conditions are to be represented on the display map. A more detailed operation of the display unit utilizing more than a single light for each sensor station is described in greater detail infra. For any arrangement, of course, it is apparent that greater accuracy would be attained by utilizing a larger display map to cover a given area.

The display system programming unit 33 may take any one of a number of forms. Two methods would involve maintaining a matrix for the display lamps within the computer. With one of these two methods each lamp circuit line from the computer would be fed to a small power amplifier that would provide sufficient power to light the associated display lamps. Another possible method would employ lamp circuit lines from the matrix to operate reed relays which in turn would operate the lamps.

For the purpose of explaining the system described herein, the method described does not involve maintaining display lamps matrices within the computer. The technique involves the use of a crossbar switch of the type described above. Such systems are readily available commercially.

Programmer 33 is capable of accepting display data from the computer system in binary coded decimal (BCD) form. A typical circuit for controlling the crossbar switching system, and which would be disposed within the display system programmer 33, is illustrated in FIG. 32 of the above referenced James Cunningham, Son and Company, Inc. bulletin 131. The computer system is directed to scan whichever memory file in computer 31 contains the information to be displayed. For each lamp in the display system 35 that is to be lighted, computer 31 sends a matrix address signal to the programmer 33 in BCD form. Programmer 33 then generates "select" and "hold" signals for the proper crossbar point to close the circuit to the addressed lamp. Circuitry is provided to cause the "select" and "hold" signals to remain on for a period slightly longer than the period of scan of the system. In this way, each lamp remains on until the next scan of the sensor stations. If the situation has changed between successive scans (for instance, if the sensor station is no longer the last reported location of a vehicle in the fleet), then on the next scan an address to the corresponding display lamp is not received. The circuitry which had previously been holding that lamp on then allows the lamp to extinguish.

If the system were utilized for the purpose of keeping track of passenger buses, the following information could be displayed in the overlay map system:

1. the locations of all the buses;
2. the locations of any buses that are reporting an emergency situation;

3. the locations of all buses ahead of schedule;
4. the location of all buses behind schedule;
5. the location of any specific bus in the system upon request; and
6. the direction of travel of any specific vehicle in the system upon request.

In a typical system, it would not be necessary to display all of the above information simultaneously on a continuous basis. Displays of specific bus location (5) and direction of travel (6), both being only by request, could time-share the display of the locations of all buses in the system. The four remaining types of displays are then able to utilize four sets of different colored lights such as green, red, yellow and blue. The lights could be arranged in clusters of four, one light of each color to each cluster, and the clusters centered around sensor locations as located on the overlay display map 35.

The four continuous displays would be achieved by programming the computer 31 to continually and sequentially scan the memory files in the computer which contain the information to be displayed. For instance, in one portion of each scan period, computer 31 would scan the sensor location/vehicle identity memory file 133. That is, the computer would search the sectors of file 133 allocated to each sensor station in the system. If vehicle identification data is stored in a memory sector, this indicates that this is the last reported position of at least one vehicle. The location address corresponding to the sensor location is automatically sent in *BCD* form to the display system programmer 33 as routing information. Programmer 33 then generates select and hold signals to close the proper contact in the crossbar switch matrix. If green lamps have been chosen, for example, to indicate the locations of all the buses in a system, then the contact closed in the switch matrix would cause the green lamp to light in the cluster of lamps corresponding to the sensor station in question. When the scan of file 133 has been completed, a green lamp will have been lighted in each cluster that corresponds to a last reported sensor station location of any bus in a system.

The next file to be scanned would be the emergency situation/vehicle identification file 119. If emergency situation locations are indicated by red lights, for example, then the procedure for turning on the red lamps at every emergency situation location would be the same as that just described for turning on the green lamps.

A similar search of the sensor location/ahead of schedule file 131 is then made to turn on yellow lamps, for example, at last-reported locations of ahead of schedule buses, and a search of the sensor location/behind schedule vehicle identity file 127 is then made to turn on blue lights, for example, at last-reported locations of behind schedule buses.

Upon completion of the search of this latter file (127), the computer then repeats the sequence, starting again with the search of the sensor location/vehicle identity file 133. On this next search of file 133, an address of each green lamp to be lighted or to remain lighted is again sent in *BCD* form to the display system programmer 33. Where the address corresponds to a green lamp that is already lighted, the operation of programmer 33 would be to reenergize the retainer circuit of the select and hold contacts so as to retain the contact closure for the duration of another full scanning period.

Assume now that the vehicle 11, in this case a bus, has left sensor station 17 and has traveled to sensor station 15. On the next scan, no *BCD* routing information is received by the display programmer 33 for the green lamp in the lamp cluster corresponding to the location of sensor 17. Since the retainer circuit for the select and hold contacts of the lamp for sensor station 17 are not reenergized on this scan, the contacts automatically break within a matter of milliseconds and the lamp becomes extinguished. In this way the green lamps of the overlay map display are continually updated to show the last reported position of all of the vehicles in the system, and the red, yellow and blue lamp displays are updated similarly.

The display of both the present position and the direction of travel of any particular vehicle could be accomplished by the time-sharing of the green lamps in the overlay map display 35. Display of such information is upon inquiry only, and the display is only required to stay on long enough for the dispatcher to note the location of the vehicle that he has inquired about. Therefore, this display may be accomplished by having all of the green lamps go out except the green lamp corresponding to the location of the vehicle in question. The green lamp corresponding to the prior position of the vehicle would be made to flash on and off to indicate the direction of travel.

Both the steady green lamp and the flashing green lamp would be made to light by a procedure similar to that already described. In the case of the steady green lamp present position display, the computer performs a search of the vehicle identity/sensor location and vehicle data file 121 for the location of the vehicle in question. Upon locating the vehicle in the memory file, the computer 31 sends an address of the location in *BCD* form as routing information to the display programmer 33, causing the corresponding green lamp to light. The scan of this file would be continually repeated for the duration of the display so as to keep the retainer circuits energized and keep the lamp turned on. Also, should the vehicle change its location while its position is being displayed, this continuing search of the file causes the display to keep up with the movement of the vehicle.

The flashing green light prior position location display would be accomplished by a similar search of the vehicle identity/prior sensor location file 121. In this case, however, the computer 31 would be programmed to search this file for alternate seconds only. That is, it would search the file for 1 second, and then not search it for a second, and then search it for a second, and not search it for the next second. This would cause the green lamp corresponding to the prior position of the vehicle to alternately flash on and off for 1 second at a time. After a preset period of time, or when directed by the operator, the display system would return to its normal operation with the green lamps displaying the locations of all the vehicles in the system.

For purposes of reference and to facilitate understanding of the operational sequence of the system described above, appendices A, B, and C are attached hereto, illustrating three different computer routines designed to accomplish the computer functions described in detail supra. Appendix A is a diagram of the update routine for the overlay map display system 35. Appendix B is a diagram of the specific vehicle location request routine. Appendix C is a diagram of the computer routine performed in response to a request for the nearest vehicle to a specific location. The explanatory notes accompany the respective appendices define certain shorthand notations employed in the diagrams.

The conventions employed in the computer routine diagrams of Appendices A, B, and C are conventional, being described in the textbook "A Programming Language" by K. Iverson, John Wiley and Sons, 1962. Rectangular boxes indicated processes to be performed and hexagonal boxes contain an augmentation of some quantity and/or comparison to be made on the result. The described operations are basic operations, such as addition, subtraction, and comparison, which are generally available in any digital computer.

APPENDIX A

File and Overlay Map Update Routine

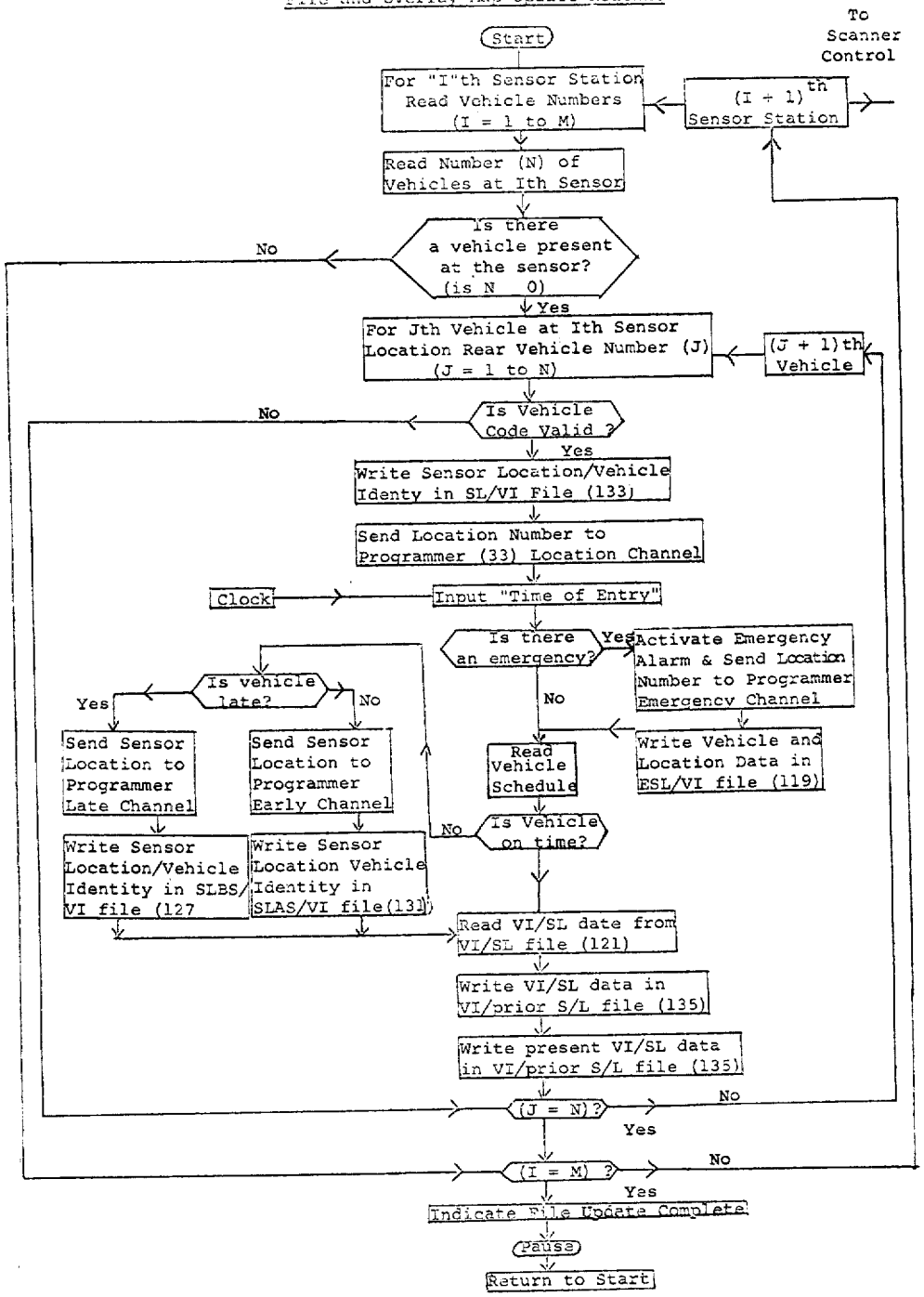

The update routine assumes that there are $M$ sensor stations and the $I$th sensor station is being polled at any time. In other words, $I$ is sequentially given all values from $l$ to $M$ as the sensor stations are sequentially polled or scanned. Similarly, $N$ represents the number of vehicles currently at the Ith station, and the routine sequentially processes data from these vehicles. The vehicle whose data is being processed at any time is denoted as the $J$th vehicle. Thus, if after processing the date from the $J$th vehicle at the $I$th sensor station, we find that $J \neq N$ (that is, we find that there are still vehicles at the $I$th sensor station whose data have not been processed) we proceed to the $(J+l)$th vehicle at the $I$th sensor station, etc. After data from all of the vehicles at the $I$th sensor station have been processed, the $(I+l)$th sensor station is polled. This process continues until all $M$ sensor stations have been polled ($I = M$). The functions of the various memory files referred to in the routine have been described in detail infra.

APPENDIX B
Vehicle Location Request Routine
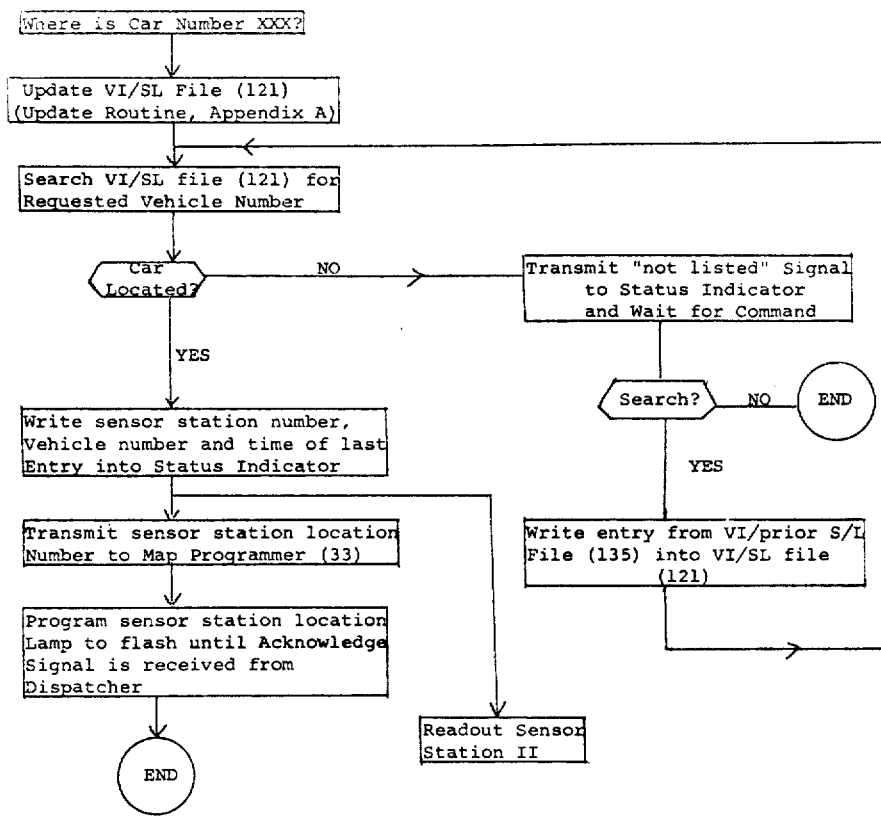
APPENDIX C
Nearest Car to Location Routine
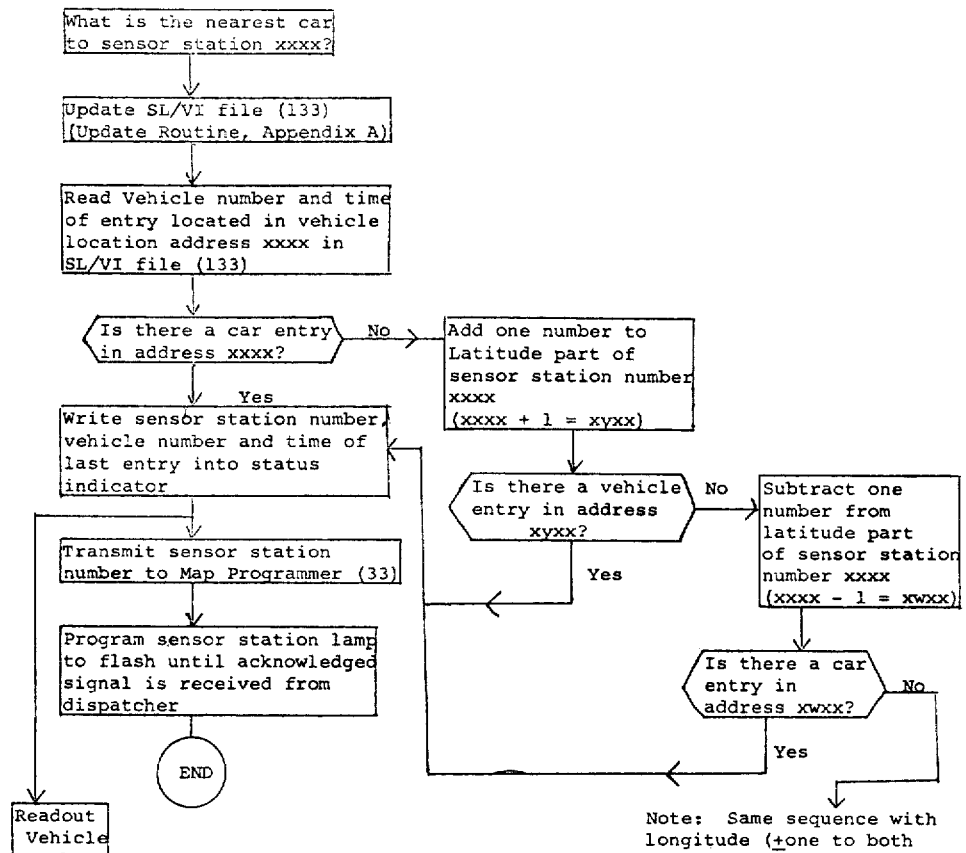
Note: Same sequence with longitude (±one to both numbers), then ± two to latitude, ± two to longitude, ± two to both, etc.

The process described in the Vehicle Location Request Routine is self-explanatory, in view of the descriptions of the various memory files in FIG. 5. The Status Indicator referred to in the routine is a device for providing a readout of the requested information. Similar comments apply to Appendix C.

While I have described and illustrated one specific embodiment of my invention, it will be clear that variations of the details of construction which are specifically illustrated and described may be resorted to without departing from the true spirit and scope of the invention as defined in the appended claims.

I claim:

1. A system for monitoring the locations of a plurality of vehicles within a prescribed area, said system comprising:
    a plurality of signal transmitter means, one each carried by a respective one of said plurality of vehicles, for continuously emitting signals which are individually coded to identify the vehicle from which the emitted signal originates;
    a plurality of sensor stations disposed at preselected locations within said prescribed area, each sensor station including means for receiving emitted signals from respective vehicles located within a predetermined distance from that sensor station and for providing a receiver output signal in response to each emitted signal received, said receiver output signal being coded to identify the vehicle from which that emitted signal was received;
    decoder means responsive to application thereto of a receiver output signal for providing a digital signal which is coded to identify the respective applied receiver output signal;
    scanning means for continuously and sequentially scanning said sensor stations and applying receiver output signals appearing at a station being scanned to said decoder means; and
    data processing means synchronized with said scanning means and responsive to said digital signals for storing information representing the location of said plurality of vehicles, said information relating each vehicle to the respective sensor station which was the most recent sensor station to receive the emitted signal from that vehicle.

2. The system according to claim 1 wherein said transmitter means each includes means for continuously providing a radiofrequency carrier signal, at least one coding frequency signal generator and modulator means for modulating said carrier signal with said coding frequency signal to provide the identification coding of said emitted signal.

3. The system according to claim 2 wherein each transmitter means includes $P$ coding frequency signal generators for providing $P$ different identification coding frequencies, the combination of $P$ coding frequencies being different at each of said transmitter means, there being $N$ possible identification coding frequencies available for use by all said vehicles, $N$ being greater than $P$, all $N$ coding frequencies being geometrically spaced such that no coding frequency has either a second or third harmonic relationship with any other coding frequency, and wherein said modulator means includes means for modulating said carrier signal with said $P$ coding frequency signals.

4. The system according to claim 3 wherein said coding frequencies all fall in the audio frequency range and wherein said modulator means comprises an amplitude-modulator.

5. The system according to claim 4 wherein said sensor stations each include amplitude-modulation receiver means responsive to reception of an emitted signal from a vehicle for detecting the audio tone coding frequencies which modulate the emitted signal; wherein said scanning means includes means for sequentially applying the detected audio tones from all said sensor stations to said decoder means; wherein said decoder means includes a bank of filters having respective filter sections tuned to each of said $N$ coding frequencies, each filter section having detector means connected thereto for providing a binary signal at a first level in response to passage of an audio tone through said filter section and at a second level when no audio tone is passed through said filter section, the binary signals provided by all said detector means comprising said digital signal.

6. The system according to claim 5 wherein the signals emitted by said transmitter means are additionally selectively codable to represent status conditions of the vehicle from which each emitted signal originates, said status conditions being represented by respective combinations of $N'$ audio tone coding frequencies amplitude-modulating said radio frequency carrier, said $N'$ coding frequencies being geometrically spaced relative to each other and to said $N$ identification coding frequencies such that none of the $N + N'$ coding frequencies have a second or third harmonic relationship to any other of said $N + N'$ coding frequencies, wherein said bank of filters includes additional respective filter sections tuned to each of said $N'$ status coding frequencies, and wherein each of said additional filter sections have a detector means connected thereto for providing a binary signal at a first level in response to passage of an audio tone through said filter section and at a second level when no audio tone is passed through said filter section, the binary signal provided by said last mentioned detector means comprising part of said digital signal, and wherein said data processing means includes means for storing status information for said vehicles.

7. The system according to claim 6 is further comprising display means responsive to said data processing means for indicating each sensor station corresponding to a last-reported location of a vehicle, and for indicating status information of said vehicles at their respective last-reported locations.

8. The system according to claim 7 wherein said display means comprises a map of said prescribed area, the location of each of said sensor stations being represented on said map by a first lamp which is lighted when that sensor station is the last-reported location of one of said vehicles, at least one additional lamp being provided at each sensor station location on said map to represent said at least one status condition of each vehicle whose last-reported location is that sensor station.

9. The system according to claim 6 further comprising a display means responsive to said data processing means for indicating each sensor station corresponding to a last-reported location of a vehicle.

10. The combination according to claim 9 wherein said display means comprises a map of said prescribed area, each of said sensor stations being represented on said map by a lamp which is lighted when that sensor station is the last-reported location of one of said vehicles.

11. The system according to claim 1 wherein each vehicle further carries means for selectively transmitting a signal indicative of an emergency status.

12. The system according to claim 1 wherein said transmitter means includes means for selectively coding said emitted signal to represent at least one status condition of the vehicle from which the emitted signal originate.

13. The system according to claim 1 wherein said prescribed area is at least a portion of a city and wherein said sensor stations are street-side installations.

14. The system according to claim 13 wherein said plurality of vehicles are police vehicles and wherein said sensor stations are police call boxes.

15. The combination according to claim 14 wherein each emitted signal is a radio frequency carrier signal amplitude-modulated by respective multiple coding frequencies to provide identification coding of each emitted signal, wherein said sensor stations each include amplitude-modulation receiver means responsive to reception of an emitted signal from a vehicle for detecting the coding frequencies which modulate the emitted signal, wherein said scanning means sequentially applies the detected coding frequencies from all said sensor stations to said decoder means, and wherein said decoder means is located in a police precinct house, transmission of said detected coding frequencies from said police call boxes to said precinct house being accomplished over telephone lines.

16. The system according to claim 15 further comprising display means responsive to said data processing means for indicating each sensor station corresponding to a last-reported location of a vehicle.

17. The combination according to claim 16 wherein said coding frequencies are audio tones, wherein each vehicle has a unique combination of P different identification coding frequencies, there being N possible coding frequencies available for use by all said police vehicles, all N coding frequencies being geometrically spaced so that no coding frequency has a second or third harmonic relationship with any other coding frequency.

18. The combination according to claim 17 wherein each of said police vehicles is equipped with a two-way radio system having transmitter independent of said transmitter means, and further comprising emergency means for selectively amplitude-modulating the carrier frequency of the two-way radio transmitter with the coding frequencies of said transmitter means.

19. The combination according to claim 13 wherein said plurality of vehicles are public buses.

20. The system according to claim 7 wherein said prescribed area is at least a portion of a city, and wherein said sensor stations are street-side installations.

21. The system according to claim 3 further comprising means for intermittently pulsing said transmitter means of each vehicle at a random rate whenever that vehicle is stopped to prevent interfering reception of emitted signals from two or more stopped vehicles at a single sensor station.

22. The system according to claim 3 further comprising means for intermittently pulsing said transmitter means of each vehicle at a specified rate whenever that vehicle is traveling below a predetermined speed.

23. The system according to claim 5 further comprising identification code verification means responsive to said digital signal for monitoring the number of binary signals therein at said first level and for rejecting said digital signal to prevent processing thereof whenever the number of binary signals at said first level is less than or greater than P.

24. The system according to claim 5 further comprising memory means for storing the digital signals provided in response to scanning of each sensor station until that sensor station is scanned again in sequence, and comparator means for providing as said digital signal only those binary signals which are identical upon successive scans of the same sensor station.

25. The system according to claim 25 further comprising identification code verification means responsive to said digital signal for monitoring the number of binary signals therein at said first level and for rejecting said digital signal to prevent processing thereof whenever the number of binary signals at said first level is less than or greater than P.

26. A system for monitoring the location of at least one vehicle within a prescribed area, said system comprising:
  transmitter means carried by said at least one vehicle for continuously emitting a relatively low power repetitive radio frequency signal;
  a plurality of sensor stations disposed at preselected locations within said prescribed area, each sensor station including receiver means for receiving said radio frequency signal when emitted from a location within the receiving range of that sensor station, said sensor stations being spaced sufficiently that said vehicle is in the receiving range of only one sensor station at a time regardless of the location of said vehicle within said prescribed area, said sensor stations further including means for providing an output signal when said relatively low power radio frequency signal is received by said receiver means; and
  scanning means for continuously and sequentially scanning said sensor stations to detect the presence of an output signal thereat, the rate of scanning said sensor stations being selected to prevent said vehicle, travelling at its maximum speed, from passing through the receiving range of a sensor station between successive scans of that sensor station.

27. The method of tracking the location of a movable object within a prescribed area, said method comprising the steps of:
  a. continuously emitting from said object a repetitive identification signal uniquely representative of said object;
  b. receiving said identification signal at a plurality of spaced locations with said prescribed area, the power of said identification signal being sufficiently low and the spacing between said spaced locations being sufficiently great to normally prevent more than one spaced location at a time from receiving said identification signal; and
  c. indicating which of said spaced location most recently received said identification signal.

28. The method according to claim 28 including the step of scanning said spaced locations in continuous sequence to detect reception of said identification signal thereat.

29. The method according to claim 28 wherein said movable object is a vehicle, and wherein said method is employed to track the locations of a plurality of vehicles within said prescribed area, wherein each vehicle continuously emits an identification signal uniquely representative of that vehicle.

30. The method according to claim 29 wherein the step of continuously emitting comprises, for each vehicle, the steps of:
  generating a low power radiofrequency carrier signal;
  generating P audio tones at different frequencies, each vehicle generating a unique combination of audio tones; and
  amplitude modulating said carrier signal with said audio tones to provide said identification signal.

31. The method according to claim 30 wherein said P audio tones are selected from N possible audio tones, the frequencies of said N audio tones being geometrically spaced such that none of the N audio tones have second and third harmonic relationships with one another.

32. The method according to claim 30 further comprising the steps of:
  monitoring the number of audio tones which are amplitude-modulating each of said received identification signals; and
  rejecting all received identification signals which are amplitude-modulated by a number of audio tones not equal to P.

33. The method according to claim 29 further comprising the step of selectively coding said identification signal at each vehicle to represent a status condition for that vehicle.

34. The method according to claim 29 further comprising the step of storing at the location of each vehicle the last spaced location to receive the identification emitted from said each vehicle.

35. The method according to claim 29 further comprising the step of automatically pulsing said identification signal of each vehicle on and off whenever the speed of that vehicle is below a predetermined speed.